United States Patent [19]

Brown

[11] 3,924,212

[45] Dec. 2, 1975

[54] FENDER PROTECTOR CLOTH WITH FLEXIBLE MAGNETIC STRIPS

[76] Inventor: Fred C. Brown, 3462 - 79th Ave. North, St. Petersburg, Fla. 33702

[22] Filed: Aug. 21, 1974

[21] Appl. No.: 499,544

[52] U.S. Cl. ................ 335/303; 248/206; 335/285
[51] Int. Cl.² .......................................... H01F 7/02
[58] Field of Search .......... 335/285, 303, 306, 295; 248/206; 150/52 K; 280/150; 160/DIG. 16, 160/354; 7/1 Q; 296/136

[56] References Cited

UNITED STATES PATENTS

| | | | |
|---|---|---|---|
| 2,597,601 | 5/1952 | Sherman | 7/1 Q |
| 3,665,355 | 5/1972 | Sasaki et al. | 335/306 |
| 3,727,658 | 4/1973 | Eldridge, Jr. | 335/303 |

FOREIGN PATENTS OR APPLICATIONS

| | | | |
|---|---|---|---|
| 1,359,867 | 3/1964 | France | 335/285 |
| 1,254,960 | 1/1961 | France | 335/303 |

Primary Examiner—Harold Broome
Attorney, Agent, or Firm—Mason, Mason & Albright

[57] ABSTRACT

A fender protector of the type used by automobile mechanics composed of a vinyl cloth-backed fabric on which is affixed by contact cement flexible magnetic strips alternated from one side to the other to render the cloth nonslippable along the fender and provide the mechanic ribbed and magnetically responsive areas where he can temporarily place and secure tools and parts. The magnetic strips are preferably spaced at equal distance apart and parallel. However, there may be more magnetic strips in one side of the cloth than the other and may be concentrated in a specific area of nearer to one edge of the cloth of the protector.

9 Claims, 3 Drawing Figures

FENDER PROTECTOR CLOTH WITH FLEXIBLE MAGNETIC STRIPS

BACKGROUND AND SUMMARY OF THE INVENTION

Magnetic tool holders are exemplified by U.S. Pat. No. 3,204,776 and fender protector cloths for holding tools are disclosed in U.S. Pat. No. 3,298,712. U.S. Pat. No. 3,665,355 discloses a protective fender cover of vinyl or synthetic sheeting with elongated flexible magnets affixed therein. The function of a fender protector is primarily to protect an automobile fender that so oil, grease and the dirt or the like will not contact the painted surface while the automobile engine is being worked on; nor is the fender scratched or otherwise marred by tools or the like which the mechanic might otherwise place on the fender. Unfortunately there is a tendency for a fender protector cloth to be accidently displaced with tools and parts thereby caused to fall to the floor or into the motor well with the resulting inefficiency while the mechanic finds and retrieves them. Also, not all tools and parts are attracted by magnetic materials. Thus a need exists, and has existed for a number of years for a fender protector cloth which adequately performs its function to protect the fender and, at the same time is difficult to displace accidently therefrom, and which may further provide a convenient and safe place for a temporary depository for tools and parts so that they are not likely to be accidently displaced.

In accordance with the instant invention a fender protector cloth is provided for draping across the fender which is composed of a sturdy vinyl cloth-backed fabric having affixed thereto a plurality of magnetic rubber strips alternated from one side to the other of the cloth, and which, from both the mechanical and magnetic standpoints, cause the cloth to resist movement relative to a fender over which it is draped. The strips are generally disposed parallel to the top of the fender and, again, from both a mechanical sense and magnetically, they provide an area wherein the mechanic can place his tools and parts, particularly those manufactured from iron or steel or other magnetic responsive substances, with a considerably lessened danger that they may be displaced to the floor or into the engine of the automobile.

The invention has the further advantage that it can be easily rolled for storage. If desired, a greater number of magnetic strips may be concentrated in one area of the fender cloth to provide an area of increased magnetic holding power on the protector for receiving the tools, parts and the like.

Other advantages and adaptabilities and capabilities of the invention will be appreciated for those skilled in the art from the following description and the accompanying drawings, in which:

DESCRIPTION OF THE PREFERRED EMBODIMENTS

Figure 1:
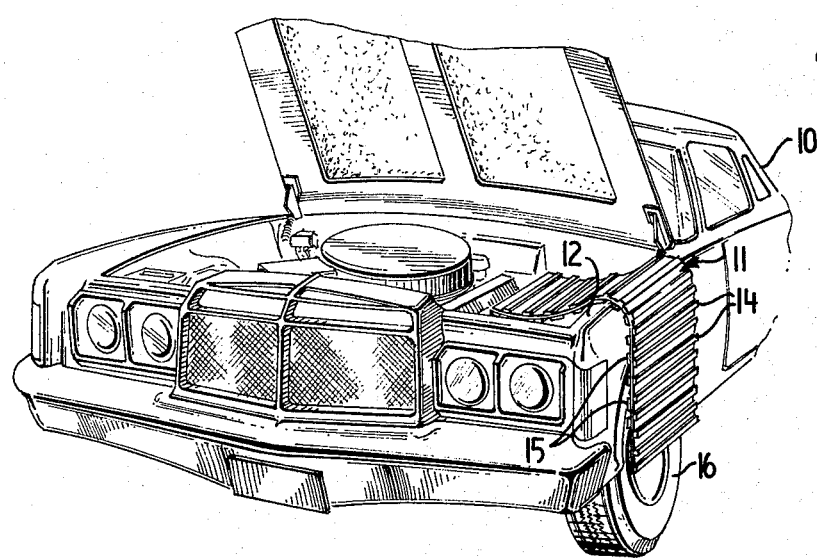
FIG. 1 is a perspective view of an automobile illustrating the fender protector cloth draped in accordance with the invention across the fender.

As will be noted from FIG. 1, an automobile 10 has a fender protector cloth according to the invention, designated generally by reference numeral 11, draped across a fender 12.

Protector 11 is preferably composed of a sturdy vinyl cloth-backed fabric and has affixed thereto a plurality of magnetic rubber strips 14 and 15, the strips 14 being on one side of the protector 11 and the strips 15 on the other. It will be noted from FIG. 2 that the strips 14 and 15 are alternately disposed on one side and then the other side of protector 11 and are generally parallel. This is the preferred mode. However, other patterns may be employed such as alternating two or three strips 14 with each strip 15.

Figure 3:
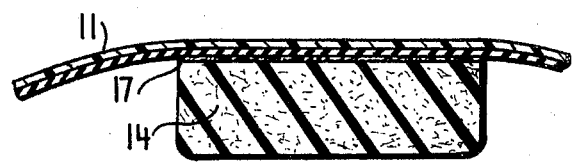
FIG. 3 is a sectional view taken on lines 3—3 of FIG. 2 showing in more detail a magnetic rubber strip affixed to the fender protector cloth.

Although protectors 11, which are preferably generally rectangular in plan, can be utilized in the invention in many different sizes, a suitable size is about 30 inches long and eighteen wide. Preferably, magnetic strips 14 and 15 are spaced about two inches apart on both sides. In other words, the lower strips 15, which, as seen in FIG. 1, function to hold the cloth to the metal surface of fender 12 may be about 2 inches apart and the upper strips 14 for holding screws, bolt, tools, metal parts and the like are divided by about 2 inches. Magnetic rubber strips 14 and 15 may be connected to protector 11 by means of contact cement 17, as seen in FIG. 3, or by other suitable securing means. When protector 11 is not in use, it can be rolled for storage, whereby strips 14 and 15 are disposed preferably transverse to the direction of rolling.

It will be understood that strips 15, being composed of a rubber-like material, increase the purchase of protector 11 on fender 12 and to this extent they serve to decrease any likelihood that protector 11 may be accidentally dislodged or moved therefrom. In like manner, the strips 14 provide a corrugated-type upper surface whereby, in addition to their magnetic capabilities, they serve to limit movement of any parts or tools which may be made of brass and the like, are less likely to be dislodged than would be the case if strips 14 were not present.

Figure 2:
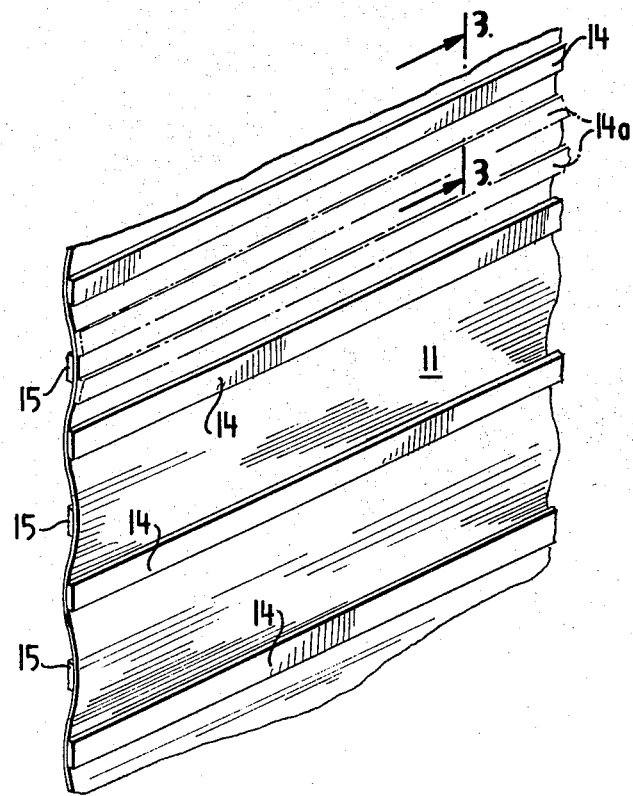
FIG. 2 shows in a fragmentary view the fender protector cloth to illustrate the disposition of the rubber magnetic strips affixed thereto.

If desired, a greater concentration of strips may be placed upon one portion of protector 11 as indicated for strips 14a shown in dot-dash lines in FIG. 2. Such concentration of magnetic rubber material tends to increase the holding capacity of protector 11 in the area involved and this area may be disposed on top of the fender or in another location such as proximate automobile wheel 16 for brake jobs and the like. In this connection, a mechanic doing a brake job on an automobile, frequently has to place a number of small parts on the floor nearby where they may be accidently stepped on or kicked. By disposing the protector 11 so that it drapes on the side of the car near such work, such parts may be generally held up and out of the way by strips 14 and also strips 14a, if provided.

In describing the above preferred embodiments, it is to be understood that components which are conventional and well known in the art have not been described in detail and, moreover, the invention is capable of other adaptations and modifications which fall within the scope of the appended claims.

Having thus described my invention, what I claim as new and desire to secure by Letters Patent of the U.S. is:

1. A mechanic's protective fender cloth which comprises a pliant cloth-like member and elongated flexible magnetic strips affixed at predetermined intervals along said cloth-like member, a portion of said strips being on one side of said cloth-like member and a further portion of said strips being on the other side of said cloth-like member.

2. A mechanic's protective fender cloth in accordance with claim 1 wherein said strips are alternately disposed on one side and then on the other side of the said cloth-like member.

3. A mechanic's protective fender cloth in accordance with claim 1, wherein each of said strips extends substantially across the entire width of said cloth-like member.

4. A mechanic's protective fender cloth in accordance with claim 1, wherein said strips are substantially parallel to each other.

5. A mechanic's protective fender cloth in accordance with claim 1, wherein one said portion has a greater number of said strips than the other said portion, the former said portion adapted for holding tools and parts.

6. A mechanic's protective fender cloth in accordance with claim 5, wherein said former portion has a larger number of said strips adjacent one edge of said cloth-like member than the opposite edge whereby one area of said cloth-like member has a greater than average concentration of said strips for holding tools and parts.

7. A mechanic's fender protector cloth which comprises a pliant member adapted to be draped across the fender of an automobile, said member including a plurality of elongated flexible magnetic means comprising parallel strips spaced alternately on opposite sides of said pliant member for magnetically holding said member on said fender and preventing the accidental displacement of tools composed of magnetically responsive material laid thereon, relative depressions being provided between adjacent magnetic means for receiving tools and parts not magnetically responsive.

8. A mechanic's fender protector cloth in accordance with claim 7 wherein a greater number of said magnetic means are concentrated in one area of said member than the remainder of said member.

9. A mechanic's fender protector cloth in accordance with claim 8 wherein said area is proximate at least one edge of said member.

* * * * *